(12) United States Patent
Fischer et al.

(10) Patent No.: US 9,062,536 B2
(45) Date of Patent: Jun. 23, 2015

(54) DEVICES AND METHODS FOR LANDFILL GAS WELL MONITORING AND CONTROL

(71) Applicant: Q.E.D. Environmental Systems, Inc., Dexter, MI (US)

(72) Inventors: David A. Fischer, Ann Arbor, MI (US); David Mioduszewski, Dexter, MI (US)

(73) Assignee: Graco Minnesota Inc., Minneapolis, MN (US)

(*) Notice: Subject to any disclaimer, the term of this patent is extended or adjusted under 35 U.S.C. 154(b) by 198 days.

(21) Appl. No.: 13/794,242

(22) Filed: Mar. 11, 2013

(65) Prior Publication Data

US 2014/0182846 A1   Jul. 3, 2014

Related U.S. Application Data

(60) Provisional application No. 61/748,370, filed on Jan. 2, 2013.

(51) Int. Cl.
  *E21B 43/12* (2006.01)
  *E21B 44/00* (2006.01)
  *B09B 1/00* (2006.01)

(52) U.S. Cl.
  CPC .............. *E21B 43/12* (2013.01); *E21B 44/00* (2013.01); *B09B 1/006* (2013.01)

(58) Field of Classification Search
  CPC ..................................... E21B 43/12; E21B 44/00
  See application file for complete search history.

(56) References Cited

U.S. PATENT DOCUMENTS

| | | | |
|---|---|---|---|
| 4,026,355 A | 5/1977 | Johnson et al. | |
| 4,159,893 A | 7/1979 | Ham | |
| 4,444,041 A | 4/1984 | Zison | |
| 4,770,676 A | 9/1988 | Sircar et al. | |
| 5,063,519 A | 11/1991 | Zison | |
| 5,355,739 A * | 10/1994 | Cooper et al. | 73/864.73 |
| 5,611,844 A | 3/1997 | Troost et al. | |
| 5,616,841 A | 4/1997 | Brookshire | |
| 5,695,641 A | 12/1997 | Cosulich et al. | |
| 6,169,962 B1 | 1/2001 | Brookshire et al. | |
| 6,393,821 B1 | 5/2002 | Prabhu | |
| 6,591,695 B1 | 7/2003 | Brookshire et al. | |

(Continued)

FOREIGN PATENT DOCUMENTS

KR       20120023267 A       3/2012

*Primary Examiner* — William P Neuder
(74) *Attorney, Agent, or Firm* — Harness, Dickey & Pierce, P.L.C.

(57) ABSTRACT

A landfill well control system includes a mobile hand-held device provided with a software monitoring application including a table having data related to determination of a desired methane gas output flow rate. A landfill gas (LFG) wellhead gas control valve includes: an electronically controlled, powered flow control device actuator; a flow measurement element producing differential pressures proportional to a gas flow rate; a pressure sensor/transducer; and a microprocessor having control logic capability and the ability to communicate via a local wireless signal to the mobile hand-held device. The powered flow control device actuator using data from the table of the mobile hand-held device or remotely stored data provides automatic valve positioning.

20 Claims, 7 Drawing Sheets

(56) References Cited

U.S. PATENT DOCUMENTS

| | | |
|---|---|---|
| 6,799,477 B2 | 10/2004 | Brookshire et al. |
| 6,999,883 B1 | 2/2006 | Brady et al. |
| 7,056,537 B2 | 6/2006 | Weschler |
| 7,198,433 B2 | 4/2007 | Augenstein et al. |
| 7,448,828 B2 | 11/2008 | Augenstein et al. |
| 7,591,866 B2 | 9/2009 | Bose |
| 7,704,291 B2 | 4/2010 | Bose |
| 7,731,779 B2 | 6/2010 | Palumbo |
| 7,972,082 B2 | 7/2011 | Augentein et al. |
| 2007/0225923 A1* | 9/2007 | Tooley .................. 702/47 |
| 2011/0231099 A1 | 9/2011 | Elkins |

\* cited by examiner

DEVICES AND METHODS FOR LANDFILL GAS WELL MONITORING AND CONTROL

CROSS-REFERENCE TO RELATED APPLICATIONS

This application claims the benefit of U.S. Provisional Application No. 61/748,370, filed on Jan. 2, 2013. The entire disclosure of the above application is incorporated herein by reference.

FIELD

The present disclosure relates to a system and method for monitoring gas produced by landfills.

BACKGROUND

This section provides background information related to the present disclosure which is not necessarily prior art.

Active and inactive domestic solid waste landfills in the United States require the installation of systems to control and capture methane produced by the anaerobic processes breaking down the waste. Safety, gas capture for energy use, and greenhouse gas control because methane has 25 times the greenhouse gas impact of $CO_2$, are some of the reasons these systems are installed. Additionally, regulations govern methane gas emissions for air pollution and safety reasons. While some landfills employ passive flare systems to burn off the methane, the present trend is to employ controlled systems that use a vacuum pump, piping and wells to draw the methane to a central location at the landfill site for use generating electricity or for gas recovery.

Data is currently collected from the numerous extraction points such as gas well heads, often as frequently as once a week. A typical landfill may consist of approximately 50 to several hundred wells and well heads. The frequency of data collection, combined with the number of data collection points, creates a large, multivariate data set that grows over time. This data known as landfill gas (LFG) data is typically stored in spreadsheets or enterprise level environmental databases. Current data use focuses on flagging exceedences, some charting and some data trend mapping as related to GPS location of the well points. Control decisions at each well head are primarily based on fixed "rules" and tend not to utilize LFG data from historical data sets. Additionally, the analysis of historical data sets for time and space trends and relationships are not used to create control modification recommendations such as positioning of control valves at the well heads.

SUMMARY

This section provides a general summary of the disclosure, and is not a comprehensive disclosure of its full scope or all of its features.

According to several aspects, a landfill well control system includes a mobile hand-held device provided with a software monitoring application including a table having data related to determination of a desired methane gas output flow rate. A landfill gas (LFG) wellhead gas control valve includes: an electronically controlled, powered flow control device actuator; a flow measurement element producing differential pressures proportional to a gas flow rate; a pressure sensor/transducer; and a microprocessor having control logic capability and the ability to communicate via a local wireless signal to the mobile hand-held device.

According to further aspects, a differential measurement device includes an internal pressure transducer, a micro-controller and a wired or wireless communications means for exchanging data over short distances to send the differential pressure measured by the differential measurement device to a mobile hand-held device, such as a smart phone or tablet. The differential measurement device can be used portably or can be dedicated to the LFG well head. The mobile hand-held device can include a program allowing the input of a pressure drop device specification.

According to other aspects, a pressure drop measurement device is connected across the flow control valve in combination with flow control valve indexing marks provided with the flow control valve to provide and reproduce an LFG flow rate. A set of printed or electronic tables or equations are used to map a relationship between the valve position of flow control valve and the indicated differential pressure, resulting in an LFG flow rate measurement. Control of the flow control valve and therefore of the overall landfill gas flow rate can be remotely controlled from offsite via a radio or wireless signal.

According to still other aspects, a combination unit includes a valve actuator controlling a position of the flow control valve and a flow measurement device. A micro-controller, at least one vacuum/pressure sensor, an LFG temperature sensor or other measurable parameter sensors can be used to provide local, automatic valve position setting. The combination unit can include various control and measurement schemes that are used to obtain a specific control point setting. The combination unit can additionally add data elements to provide a further basis for control setting changes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
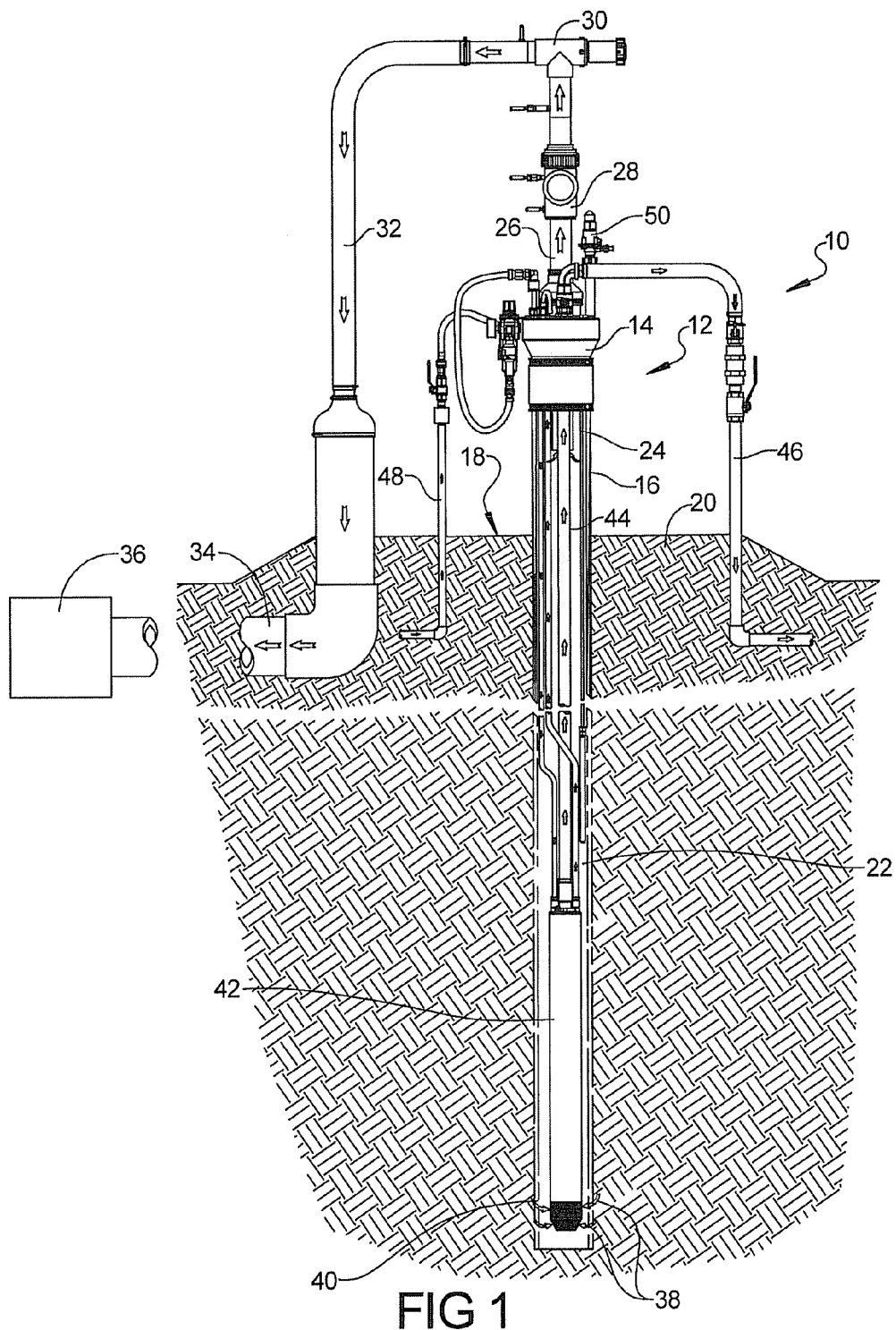
FIG. 1 is a partial cross sectional front elevational view of a landfill well assembly and associated equipment and piping having a control/operating system of the present disclosure.

Referring to FIG. 1, a typical landfill well system 10 includes a well head assembly 12 having a well head 14 mounted to a plastic well pipe 16, which is typically a six inch or eight inch pipe. Well pipe 16 can extend approximately three to four feet above a ground surface 18 of a multiple layer landfill gradient 20, or can be terminated at or below grade or ground surface 18 such that the well head 14 is positioned in a below-ground vault or enclosure. Well pipe 16 includes multiple holes 22 in a zone extending approximately thirty to over one hundred feet below the ground surface 18 that permit influx of landfill gas into the well pipe 16. Landfill gas (i.e., methane gas) is drawn into the collection well 16 into a well discharge pipe 24 that can include an above ground discharge pipe extension 26. The methane gas then passes through multiple components including an orifice assembly 28 used to measure gas flow rate, and a control valve 30 used to meter gas flow rates, and is transferred via a flow pipe 32 to a larger collection pipe 34. Collection pipe 34 is commonly connected to a vacuum producing device 36 which assists in drawing out the methane gas. Well head assembly 12 provides for, and landfill well system 10 can further include, a plurality of influent apertures 38 near the bottom end of well pipe 16 that allow liquid known as "leachate" to collect at a well pipe foot. Before reaching apertures 38, the leachate may be discharged using a pump 42, via an in-well fluid discharge pipe 44 and an external well fluid discharge pipe 46. Other services provided by well head assembly 12 include an air inlet line 48 used to power the pump 42, and a well fluid level detector 50.

Figure 2:
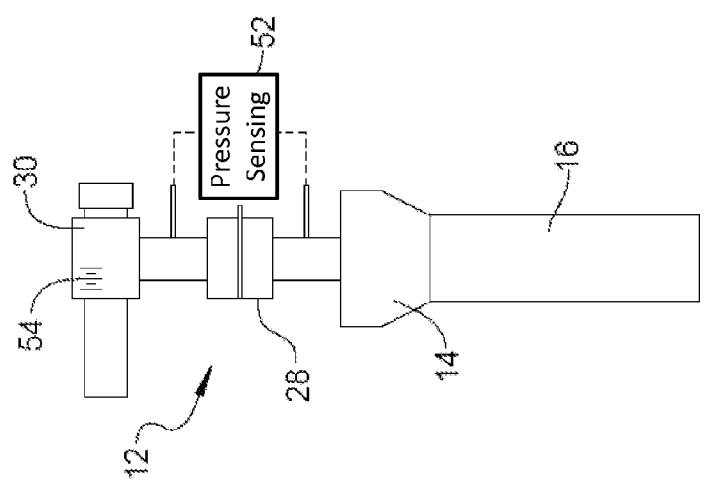
FIG. 2 is a front elevational view of a portion of the well head assembly and control valve control/operating system of FIG. 1.

Referring to FIG. 2, devices and methods to target the LFG well head assembly 12 include a flow control means in the form of flow control valve 30, a pressure gradient producing means in the form of orifice assembly 28 and a pressure drop measurement device 52. Flow control valve 30 is designed to create a repeatable and finely adjustable gas flow rate when controlling LFG flow outward from the well pipe 16 to the vacuum producing device 36. Flow control valve 30 can additionally have indexing marks 54 allowing a valve position to be recorded and enhance repeatability of the valve position for a given gas flow rate and/or for a given set of well operating parameters such as temperature, barometric pressure, humidity, and the like.

Figure 3:
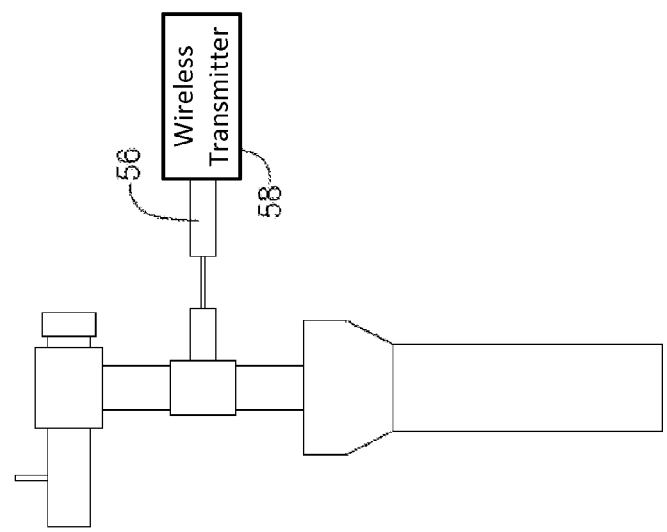
FIG. 3 is a front elevational view of a well head assembly and control valve control/operating system modified from FIG. 2.

Referring to FIG. 3, according to several aspects, a variation on the system of FIG. 2 is provided by the use of a mass flow rate device 56 for reading LFG flow rate. The mass flow rate device 56 is used in place of pressure drop measurement device 52. Mass flow rate device 56 can include a wireless transmitter 58 used to electronically send mass flow rate measurements remotely.

Figure 4:
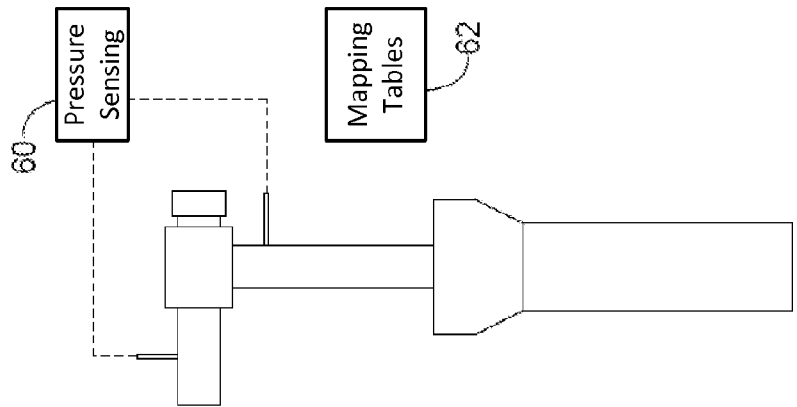
FIG. 4 is a front elevational view of a well head assembly and control valve control/operating system modified from FIG. 2.

Referring to FIG. 4, according to further aspects, a variation on the system of FIGS. 2 and 3 is to use a pressure drop measurement device 60 connected across the flow control valve 30 in combination with the flow control valve indexing marks 54 to provide and reproduce the LFG flow rate. A set of printed or electronic tables 62 or equations are used to map a relationship between the valve position of flow control valve 30 and the indicated differential pressure, resulting in an LFG flow rate measurement.

Figure 5:
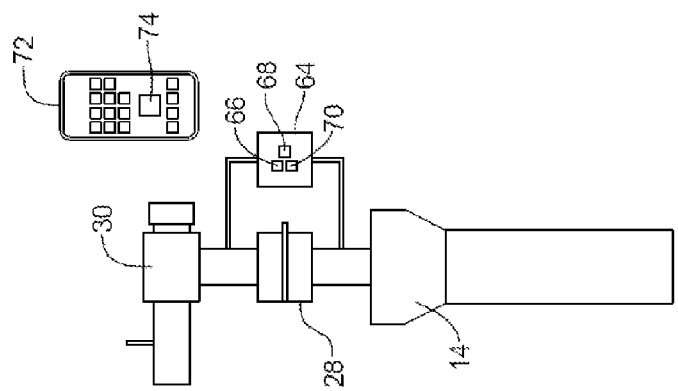
FIG. 5 is a front elevational view of a well head assembly and control valve control/operating system modified from FIG. 2.

Referring to FIG. 5, a further variation on the systems of FIGS. 2-4 is to use a differential measurement device 64, having an internal pressure transducer 66, a micro-controller 68 and a wired or wireless communications means 70 (such as but not limited to a suite of high level communication protocols using small, low-power digital radios based on an IEEE 802 standard for personnel area networks, or wireless technology standards for exchanging data over short distances (using for example short-wavelength radio transmissions in the ISM band from 2400-2480 MHz) from fixed and mobile devices, long range cellular radio, or the like) to send the differential pressure measured by differential measurement device 64 to a mobile hand-held device 72, such as a smart phone or tablet. The differential measurement device 64 can be used portably or can be dedicated to the LFG well head 14. Mobile hand-held device 72 can include a program 74 allowing the input of a pressure drop device specification. For example, for the system of FIG. 2, this could be an orifice size of the orifice assembly 28. As a further example, this could be the flow control device index position indicated by the indexing marks 54 of flow control valve 30, which allows calculation of LFG flow rate. Further, hand-held device 72 can also be used to identify or control a landfill gas quality such as methane, carbon dioxide, and/or oxygen levels.

Referring to FIG. 6 and again to FIGS. 1-5, the previous devices and methods can further include the sampling of other LFG data 76, as required. LFG data 76 can include LFG well head vacuum or pressure, LFG gas quality data, LFG gas temperature, site or ambient data readings such as barometric pressure, air temperature, and the like, and/or a geospatial location of the LFG well head 14.

Figure 7:
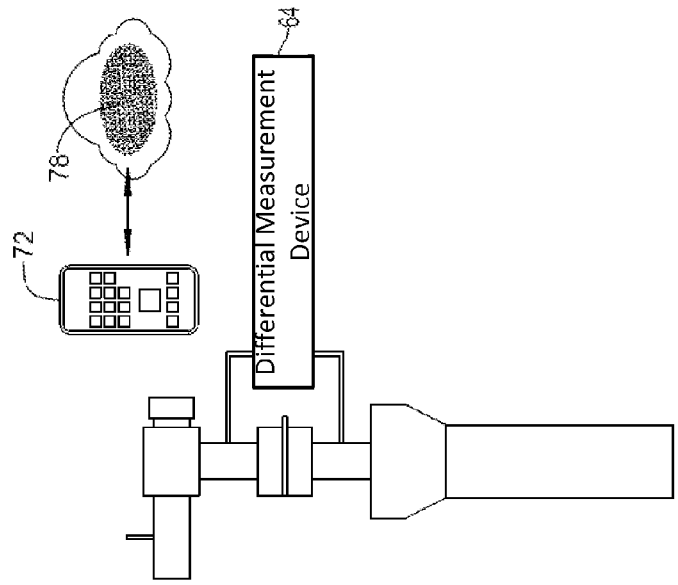
FIG. 7 is a front elevational view of a well head assembly and control valve modified from FIG. 2.
Figure 6:
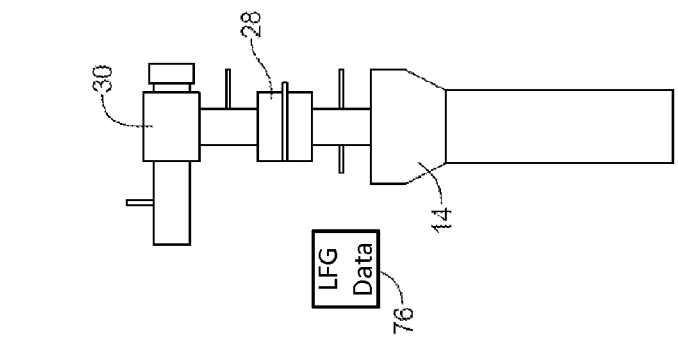
FIG. 6 is a front elevational view of a well head assembly and control valve control/operating system modified from FIG. 2.

Referring to FIG. 7, the systems described in FIGS. 5 and 6 can be further expanded by providing a data storage device 78 in communication with the mobile hand-held device 72, such that historical data and other information is accessible in the data storage device 78 at the time new data is being acquired. In addition to basic data storage, various data processing techniques can be used to provide recommended flow control valve 30 position adjustments, in near real time, to optimize the LFG well operation toward achieving system goals, such as maximizing methane recovery and/or minimizing LFG migration. Location-specific historical data and analysis can be further expanded to include one or more nearby LFG well heads 14-14n and the details of each well head's historical readings and control set points.

Referring to FIG. 8 and again to FIGS. 1-7, a powered flow control device actuator 80 can be added to the flow control valve 30, thereby providing accurate and repeatable positioning of flow control valve 30. The addition of powered flow control device actuator 80 provides an "automatic indexing" of the flow control valve 30 position. Automatic valve indexing/positioning can be provided by an embedded micro-controller 82 and logic and/or portable mobile, wired or wireless device, such as mobile hand-held device 72, providing remote control of the communication enabled valve actuator 80.

Referring to FIG. 9 and again to FIGS. 1-8, a combination unit 84 having a valve actuator and flow measurement device, plus a micro-controller 86, at least one vacuum/pressure sensor 88, an LFG temperature sensor 90 and/or other measurable parameter sensors can be used to provide local, automatic valve position setting. Combination unit 84 can include various control and measurement schemes that are used to obtain a specific control point setting, such as maintaining set levels of landfill gas flow rate or setting levels of vacuum applied to the well. Combination unit 84 can additionally add the various data elements described in reference to FIG. 6 to provide further basis for control setting changes. Combination unit 84 can be controlled remotely for example from an off-site wireless device or satellite signal.

Figure 8:
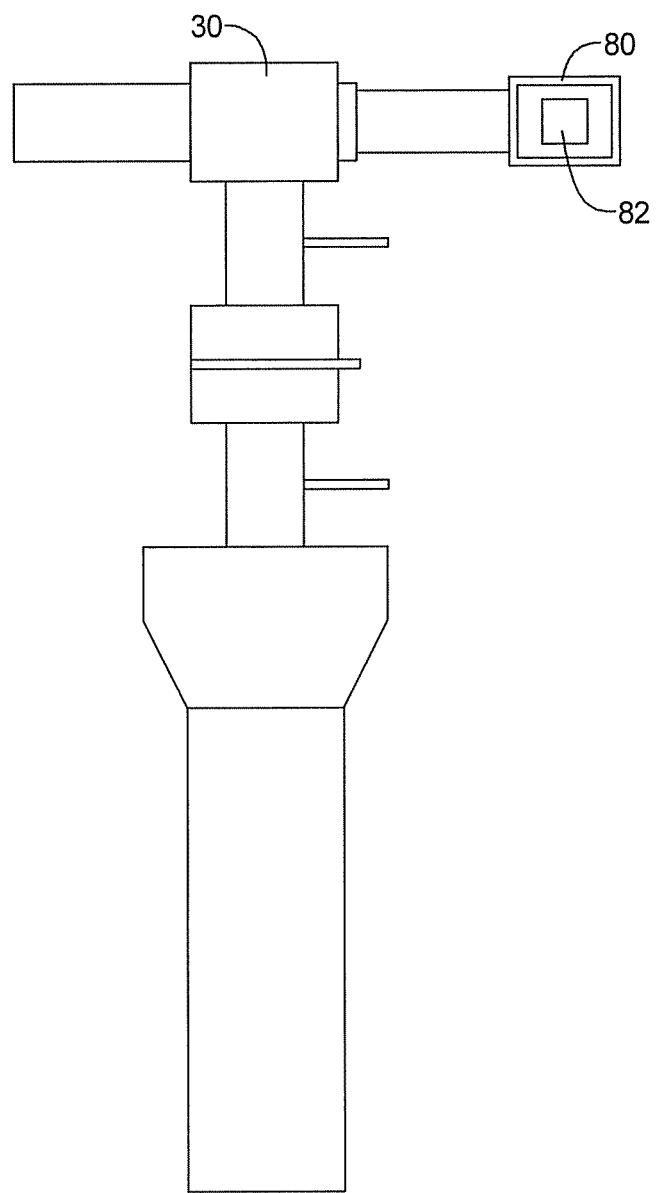
FIG. 8 is a front elevational view of a well head assembly and control valve control/operating system modified from FIG. 2.
Figure 10:
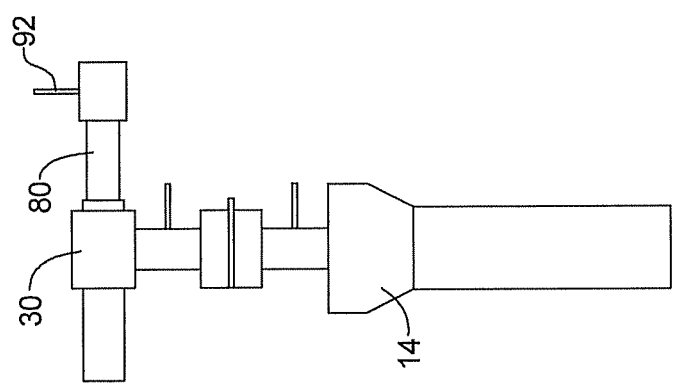
FIG. 10 is a front elevational view of a well head assembly and control valve control/operating system modified from FIG. 2.
Figure 9:
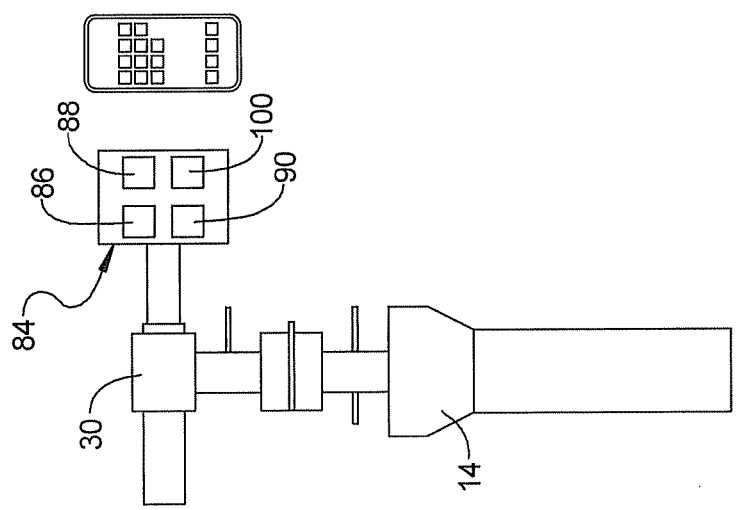
FIG. 9 is a front elevational view of a well head assembly and control valve control/operating system modified from FIG. 2.

Referring to FIG. 10 and again to FIGS. 2-9, the powered flow control device actuator 80 described in reference to FIG. 8 can be further provided with a wired or wireless communications device 92 to communicate and change the valve position with a mobile hand-held device, such as mobile hand-held device 72. Mobile hand-held device 72 can include a program to assist in valve settings. This combination allows the use of flow measurement, as described in reference to FIG. 6 to provide feedback for control changes. Additional data elements, as described in reference to FIGS. 6 and 9 can be integrated into the control logic.

Figure 11:
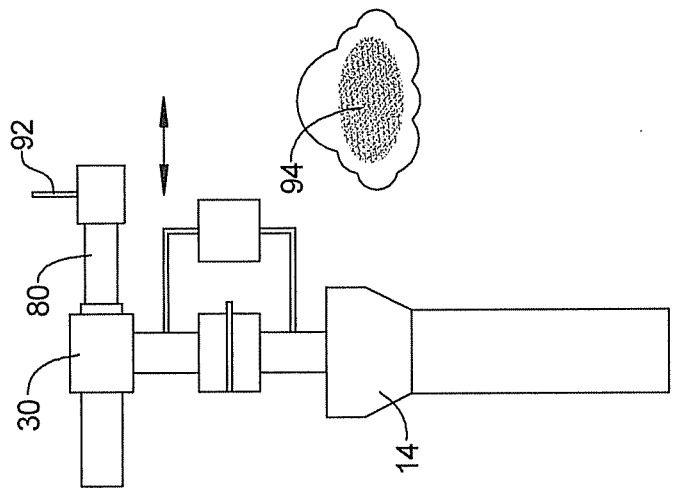
FIG. 11 is a front elevational view of a well head assembly and control valve control/operating system modified from FIG. 2.

Referring to FIG. 11 and again to FIGS. 1-10, data and control schemes can be as described in reference to FIG. 7, to include historical and "cloud data" enhanced elements 94. Additionally, embedded wireless communications device 92 is provided to the powered flow control device actuator 80, such that valve positioning can be accomplished remotely and therefore not require the mobile hand-held device 72. As described in reference to FIG. 10, wireless communications device 92 can be combined with additional data elements, as described in reference to FIG. 5, to provide the operator with context and feedback for control valve changes. In addition, remote access to historical multiple LFG well head data sets, LFG well head data for nearby and all site LFG well heads, advanced well head and site models, control algorithms, and the like as described in reference to FIG. 7 can optimize LFG control for the overall landfill site. Operator assisted control and potentially automatic control of the entire operating landfill are therefore provided. Simpler remote readout of LFG flow rate, valve position, vacuum, pressures, temperatures, and the like are also provided.

Figure 12:
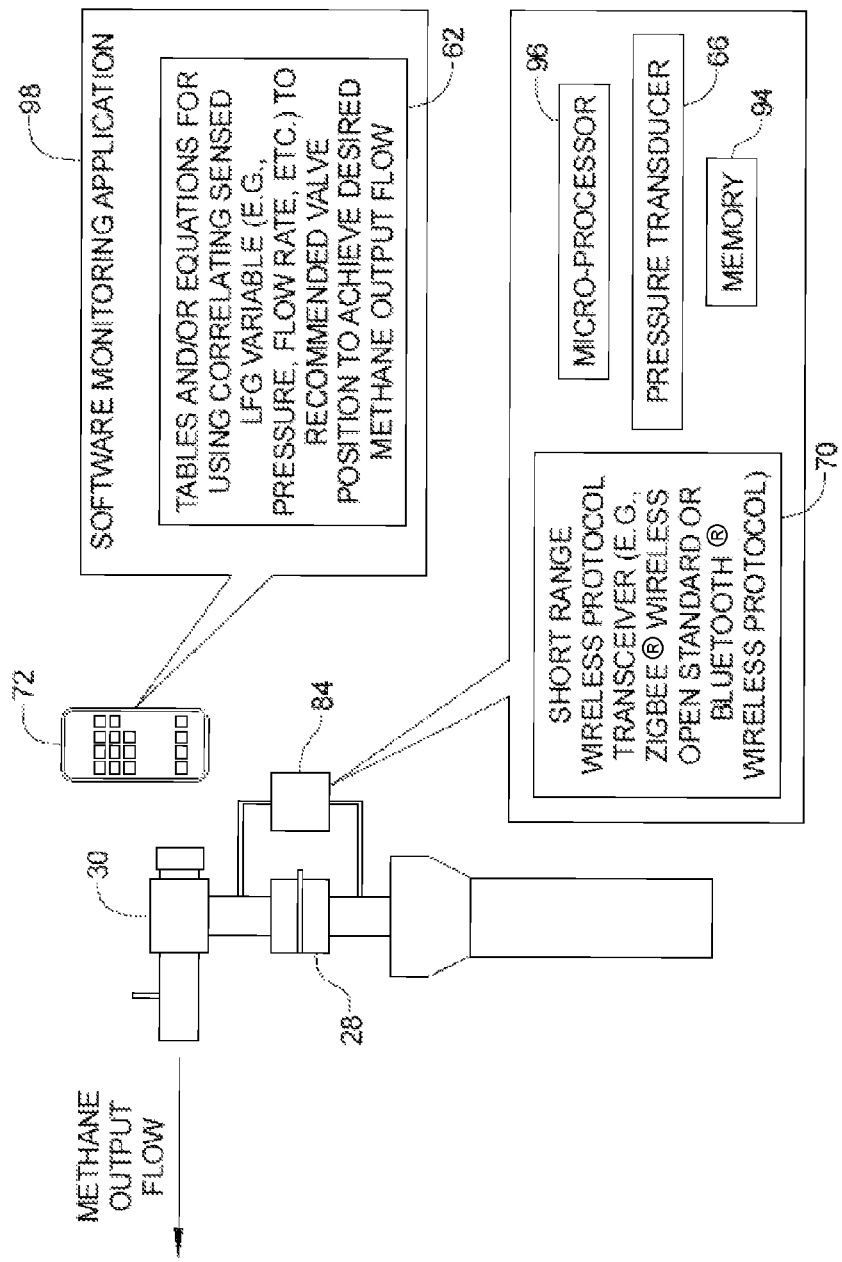
FIG. 12 is a diagram of components for a well head assembly and control valve of the present disclosure.

Referring to FIG. 12 and again to FIGS. 1-11, landfill well system 10 can provide a combination of self-regulating LFG wellhead gas flow control valve 30 that includes electronically controlled, powered flow control device actuator 80, a flow measurement element such as an orifice plate or pitot tube as orifice assembly 28 that produces differential pressures proportional to landfill gas flow rate, pressure sensors and/or transducers 66, a microprocessor 96 with control logic capability and the ability to communicate locally via a Bluetooth® protocol communications scheme or other local wireless signal to a mobile device such as a smartphone or tablet computer collectively indicated as mobile hand-held device 72. Mobile hand-held device 72 can be provided with a software monitoring application 98 that includes tables 62 having data related to determination of a desired methane gas output flow rate. The self-regulating LFG wellhead gas flow control valve 30 maintains consistent operations for the periods of time between manual setting adjustments by a human operator. A basis for the self-regulation control scheme can be to maintain constant LFG flow rate, or a constant level of vacuum applied to the well head assembly 12 or some combination of flow rate/vacuum and other site specific data (such as barometric pressure, ambient air temperature, etc.). A third basis of control can be a series of selectable control profiles of combinations of vacuum and/or LFG flow which are chosen to match the needs of a particular well head assembly 12, such as keeping the LFG flow rate below 5 scfm but above 1 scfm, or not exceeding a set upper or lower vacuum limit.

One control loop logic approach for any of the above aspects is for the self-regulating LFG wellhead gas flow control valve 30 to have microprocessor 96 periodically, such as 1-12 times daily which is user settable, evaluate the current LFG flow rate, temperature and/or vacuum applied to the well head assembly 12. If the current readings are within predetermined bounds of the desired settings then no changes are made, and the process is repeated at the next set interval. If the current readings are found to lie outside the bounds of the desired settings, the microprocessor 96 logic will "hunt" via directing slight, stepwise openings and/or closings of the control valve 30, take new measurements, then adjust again until the new control valve setting achieves readings that are within the bounds of the desired settings.

According to additional aspects, a keypad and digital display is provided at the well head 14 to enter the desired control target settings and display sensor readings. According to further aspects, a smartphone or tablet such as mobile hand-held device 72 is used to communicate control target settings and readings via a Bluetooth® protocol communications signal or other local wireless signal.

Another control loop logic approach for any of the above aspects is to use the following control logic scheme within the wellhead self-regulating LFG gas flow control valve 30: 1) periodically, such as 1-12 times daily, "hunt" via directing slight, stepwise openings and closings of gas flow control valve 30, then 2) pausing while taking new measurements, while computing the following ratio: an additional LFG flow rate gained divided by a change in vacuum level applied to the well head assembly 12. As an example, when using integral or stepwise openings of the control valve 30, at some point any additional opening of gas flow control valve 30 can result in higher levels of vacuum applied to the LFG well head assembly 12, but provide a lowered increase in the LFG flow rate than achieved in the prior stepwise openings. One explanation for this is that the current LFG well production capacity has been exceeded in terms of flow rate of high methane content LFG, defined for example as LFG content of over 50% methane. Applying additional, higher levels of vacuum beyond this point may draw additional gas flow, but this additional flow can be from undesirable near and distant leaks in the landfill cap, well casing, piping and connections. Therefore, the purpose of this control logic scheme is to open the LFG control valve at the wellhead until a selected or predetermined limit of gas flow/applied vacuum level has been achieved.

Additional variations of the systems described in reference to FIGS. 1-12 include providing a "trim" capability, whereby the operator selects a bias in a final valve position setting to achieve a desired objective for a particular well. This can include biasing toward lower LFG flow rates and/or lower levels of applied vacuum for LFG wells at the perimeter of the landfill, to avoid pulling ambient air into the LFG well and hence the collection system. Such ambient air intrusion dilutes the desired methane concentration, and/or can impair the desired activity level of the anaerobic microorganisms that produce the methane by digesting the organic materials within the landfill. Conversely, a trim setting desired for wells near a center of the landfill may be biased toward slightly higher LFG flow rates and/or higher levels of applied vacuum, to ensure that all produced gases are collected and to reduce emissions into the atmosphere of organic and/or odor-causing compounds.

In addition, a self-regulating gas flow control valve 30 as described in reference to FIGS. 2, 3, 4 and 9 can further include an O2 (oxygen) sensor 100 which by monitoring allows the operator to keep O2 level below a desired set-point. This avoids air entrainment which occurs by over-drawing or exceeding a maximum LFG flow rate of the well.

Figure 13:
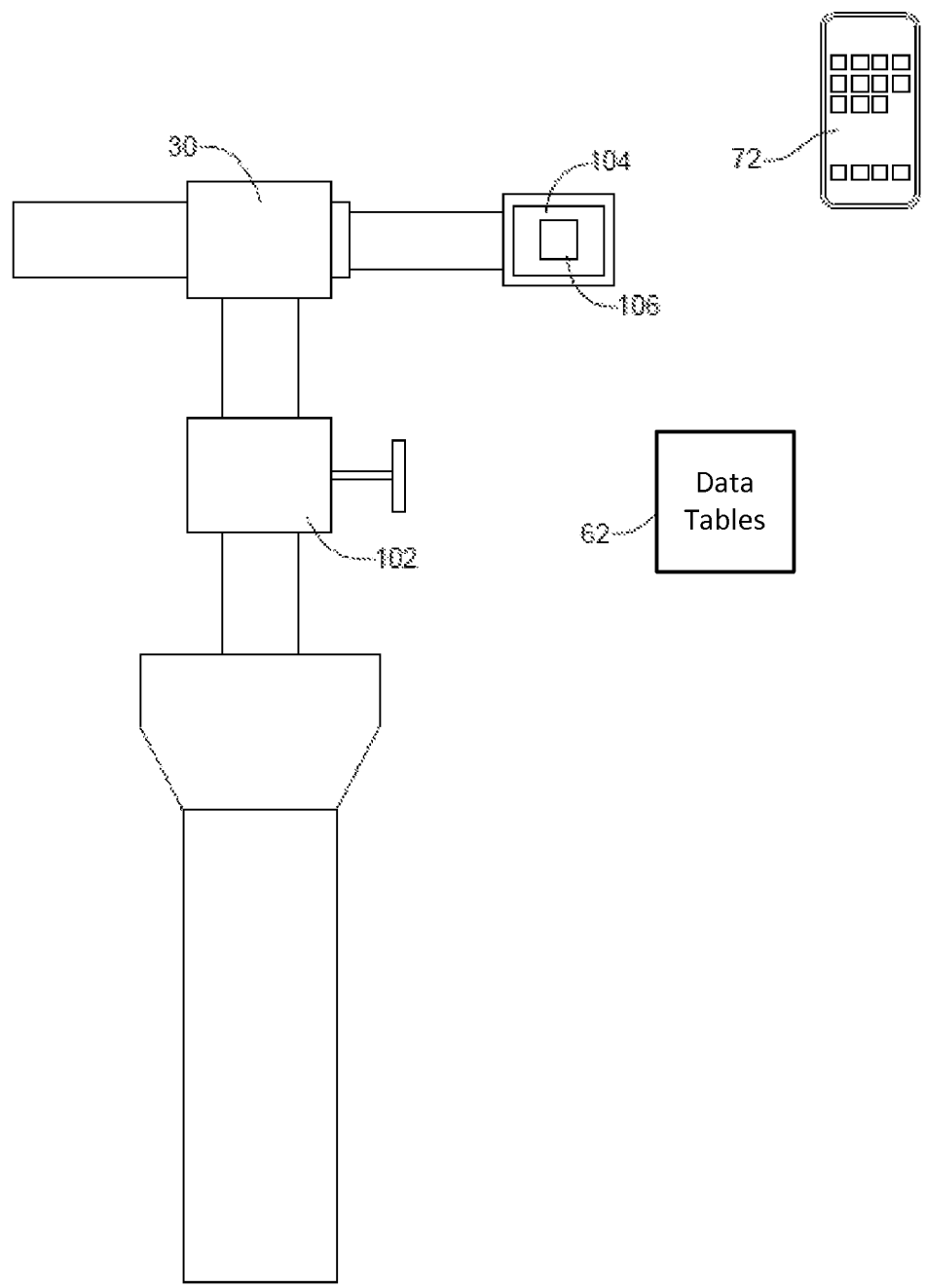
FIG. 13 is a front elevational view of a well head assembly and control valve control/operating system modified from FIG. 2.

Referring to FIG. 13, the self-regulating gas flow control valve 30 as described in reference to FIGS. 2-5 can use a fine flow control valve 102 in place of the LFG pressure drop measurement device 52, thereby also replacing separate elements such as the orifice assembly 28. A stored family of curves provided in table 62 is used to correlate pressure differential readings across the control valve 102 to a gas flow rate by ascertaining a setting of the control valve. One variation of the above is to include a keypad and digital display 104 on the gas flow control valve 30 to enter valve position settings and display sensor readings. Another aspect uses a smartphone or tablet such as mobile hand-held device 72 to communicate settings and readings via a Bluetooth® protocol communications signal or other local wireless signal. In a further aspect a position encoder 106 is provided to indicate the valve position of gas flow control valve 30 to correctly index the pressure drop to stored flow data.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A landfill well control system for use in connection with landfill well having a wellhead, wherein landfill gas (LFG) is produced within a wellbore of the landfill well and a rate of flow of the LFG out through the wellhead needs to be monitored and periodically adjusted to maintain a desired rate of flow of the LFG out through the wellhead, the system comprising:

an adjustable LFG flow control valve having a valve element, the adjustable LFG flow control valve being attached to the wellhead and dedicated to the wellhead, and further being settable at a plurality of different specified positions;

a hand holdable device having a processor with a software monitoring application running thereon, the software monitoring application including a table having stored data used by the processor in computing a desired landfill gas output flow rate, the stored data including information which maps a relationship of a specific position of the valve element within the flow control valve with an indicated differential pressure; and the hand holdable device further configured to process received data relating to the LFG flow to provide a specific, recommended control valve position adjustment for the valve element intended to achieve a specific system goal relating to the LFG being withdrawn through the adjustable LFG flow control valve.

2. The landfill well control system of claim 1, wherein:
the hand holdable device comprises a wireless communications device, and wherein the flow control device of the LFG wellhead gas control valve comprises an electronically controlled flow control device; and
further including a flow measurement element provided at the adjustable LFG flow control valve producing differential pressures proportional to the LFG flow rate, the differential pressures converted to signals communicated to the wireless communications device.

3. The landfill well control system of claim 1, further including a pressure sensor/transducer provided at the adjustable LFG flow control valve.

4. The landfill well control system of claim 1, further including a microprocessor provided at the adjustable LFG flow control valve having control logic capability and a wireless transmitter to communicate via a local wireless signal to the hand holdable device.

5. The landfill well control system of claim 1, wherein the hand-holdable device comprises a wireless device configured to communicate wirelessly with the adjustable LFG flow control valve.

6. The landfill well control system of claim 1, further including:
a pressure drop measurement device configured to be removably coupled to a pressure gradient producing orifice assembly associated with the wellhead assembly.

7. The landfill well control system of claim 1, further including indexing marks created on the adjustable LFG flow control valve identifying a plurality of corresponding valve element positions for the valve element within the flow control valve, the plurality of valve element positions enabling a user to set the adjustable LFG flow control valve to a desired position that corresponds to a desired gas flow rate and for a set of well operating parameters including temperature, barometric pressure and humidity.

8. The landfill well control system of claim 1, wherein the hand holdable device comprises a device having wireless communications capability, and further including a mass flow rate device to electronically send a wireless mass flow rate measurement signal of the landfill gas to the hand holdable device.

9. A landfill well control system for controlling a flow of landfill gas (LFG) through a wellhead associated with a landfill well at a landfill, the system comprising:
a mobile hand-held device having a wireless communications subsystem and a processor, the processor running a software monitoring application including a table, the table having data related to determination of a desired landfill gas output flow rate of a landfill gas;
an adjustable LFG flow control valve associated with the wellhead and having a valve element settable to a selected one of a plurality of independent positions to control the flow of LFG through the wellhead;
a landfill gas (LFG) wellhead measurement device including:
an electronically controlled, powered flow control device actuator for controlling a setting of the adjustable LFG flow control valve;
a flow measurement element producing differential pressures proportional to a landfill gas flow rate;
a pressure sensor/transducer; and
a microprocessor having control logic capability for controlling the electronically controlled, powered flow control device actuator, and further being configured to communicate via a short range, wireless signal with the wireless communications subsystem of the mobile hand-held device, and to use information supplied wirelessly from the mobile hand-held device to control the electronically controlled, powered flow control device actuator to adjust a setting of the adjustable LFG flow control valve to achieve a specific system goal.

10. The landfill well control system of claim 9, wherein the flow measurement element further includes an internal pressure transducer, a micro-controller and a wireless communications device including communication protocols using digital radios, the flow measurement element being connected to the LFG well head.

11. The landfill well control system of claim 9, wherein the mobile hand-held device includes a program providing for input of a pressure drop device specification including an orifice size of an orifice assembly associated with the adjustable LFG flow control valve.

12. The landfill well control system of claim 9, wherein the mobile hand-held device makes use of a flow control device index position indicated by a set of indexing marks located on the adjustable LFG wellhead flow control valve, the index position being used by the mobile-held device in determining the LFG flow rate.

13. The landfill well control system of claim 9, wherein the mobile hand-held device includes LFG data including LFG well head vacuum and pressure, LFG gas quality data, LFG gas temperature, site and ambient data readings such as barometric pressure, air temperature, and/or a geospatial location of an LFG well head.

14. A landfill well control system for monitoring and controlling a flow of landfill gas (LFG) through a wellhead of a landfill well at a landfill, the system comprising:
a wireless device provided with a processor running a software monitoring application including a table having data related to determination of a desired landfill gas output flow rate;
a combination unit including configured to be attached to the wellhead, the combination unit including:
a measurement component for making a measurement of at least one of LFG flow rate or a differential pressure;
an adjustable LFG flow control valve having a valve element which is adjustable to a plurality of positions;
an electronically controlled, powered flow control device actuator operating in communication with the adjustable LFG flow control valve, to control a setting of the adjustable LFG flow control valve in response to signals from the wireless device to achieve a specific system goal, the combination unit being in wireless communication with the wireless device; and
a data storage device operably associated with the combination unit, and being in communication with the wireless device, the data storage device retaining historical data of the landfill gas flow rate accessible in the data storage device at the same time new data is acquired.

15. The landfill well control system of claim 14, wherein the wireless device includes a mobile hand-held wireless device being configured to communicate control target settings and readings via local wireless signals to the combination unit for use in adjusting the adjustable LFG flow control valve.

16. The landfill well control system of claim 14, further including a keypad and a digital display operably associated with the combination unit, the keypad used to enter desired control target settings of the adjustable LFG flow control valve.

17. The landfill well control system of claim 14, further including an oxygen sensor monitored by an operator to maintain a landfill well oxygen level below a desired setpoint.

18. A method for controlling an output flow rate of a landfill gas flowing through a wellhead at a landfill well, the method comprising:
- using a mobile hand-holdable device having a processor running a software application to process LFG measurement data to help determine a recommended flow control valve position of an adjustable LFG flow control valve associated with the wellhead in real time, to thus adjust the output flow rate of the landfill gas in real time;
- using a hand-holdable measurement subsystem secured to the wellhead to obtain a measurement associated with a flow of the LFG through the wellhead, and wirelessly transmitting information relating to the obtained measurement directly to the mobile hand-holdable device via a short range wireless signal link; and
- using the mobile hand-holdable device to process the obtained measurement data and to determine a recommended flow control valve position setting to for use in adjusting a setting of the adjustable LFG flow control valve.

19. The method of claim 18, further comprising repeating the storing step for multiple landfill gas well heads of a common landfill site, including obtaining historical readings from individual ones of the multiple landfill gas well heads and generating multiple recommended flow control valve positions for a corresponding plurality of adjustable LFG flow control valves.

20. The method of claim 18, further comprising:
1) using the processor to periodically, including from between 1-12 times daily, control the gas flow control valve to perform repeated, stepwise openings and closings of the adjustable LFG flow control valve;
2) taking new measurements of a landfill gas flow rate as the adjustable LFG flow control valve is repeatedly adjusted by the processor; and
3) computing a ratio of an additional landfill gas flow rate gained divided by a change in a vacuum level applied to the well head assembly.

* * * * *